United States Patent Office 3,237,474
Patented Mar. 1, 1966

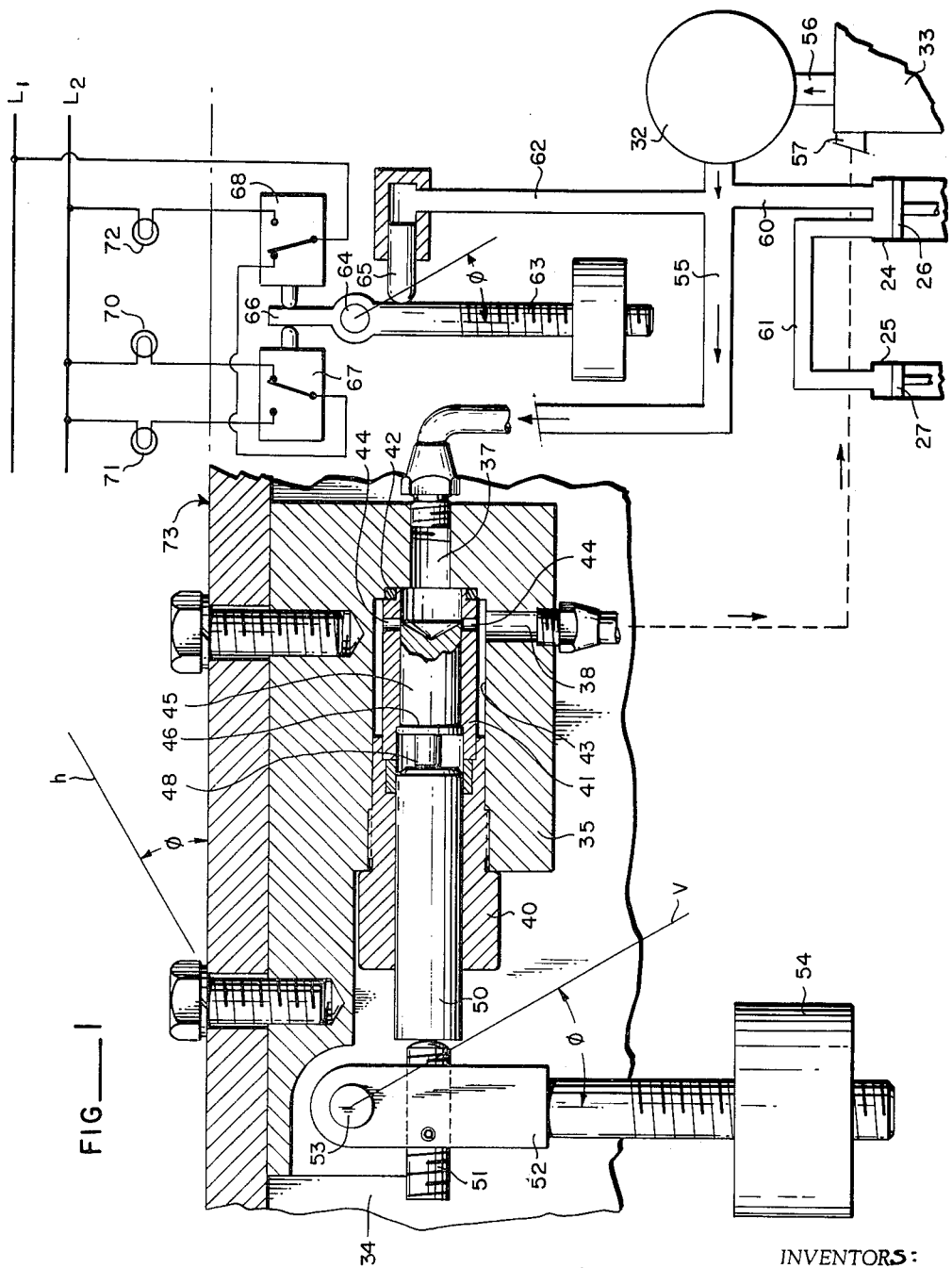

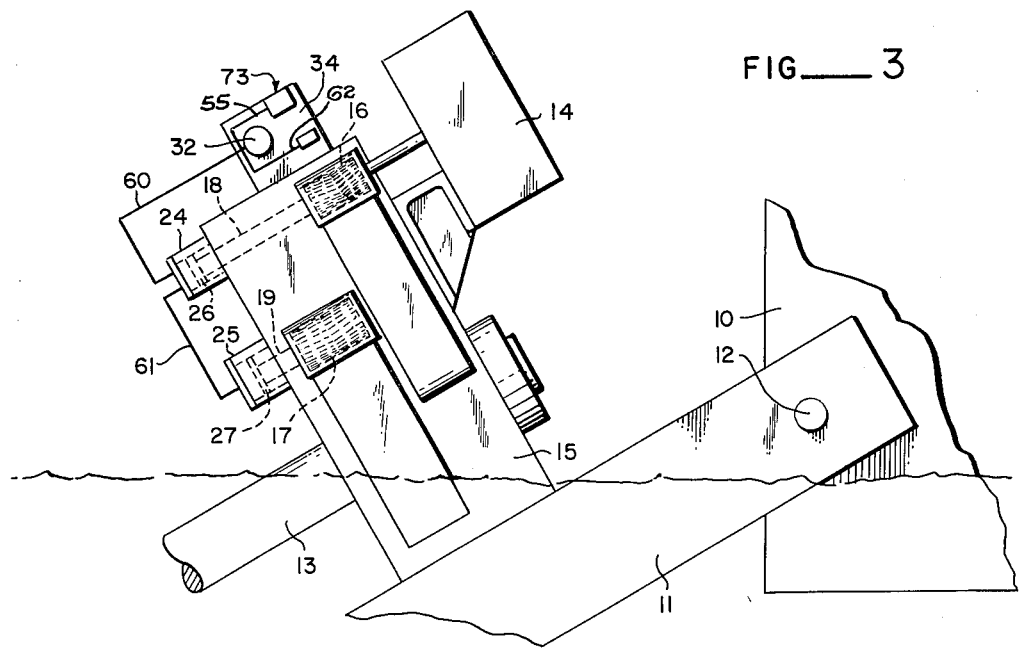
FIG__3
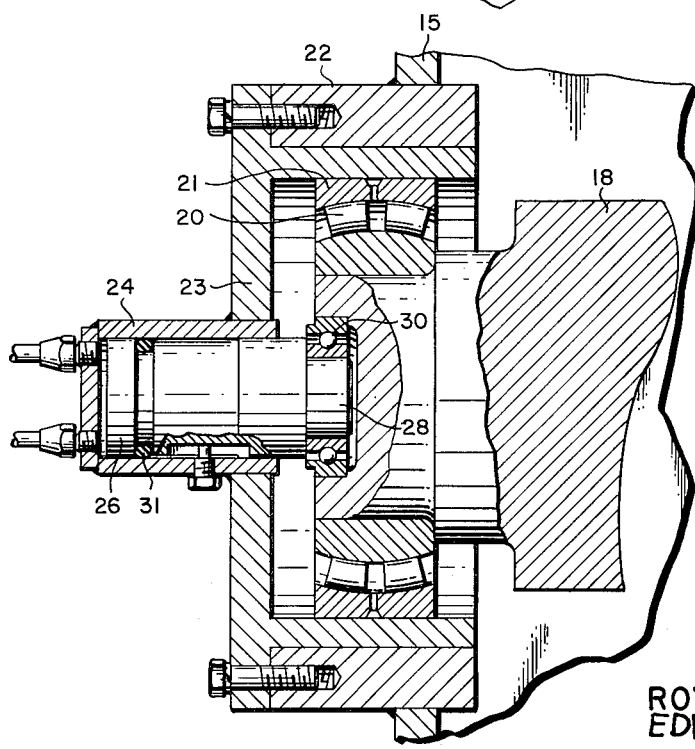
FIG__2
INVENTORS:
ROYAL T. HAWLEY
EDWARD C. O'NEAL
by Seed & Berry
ATTORNEYS

3,237,474
SYSTEM FOR BALANCING CHANGING WEIGHT-INDUCED ENDWISE THRUST UPON A SHAFT ANGLED FROM THE HORIZONTAL
Royal T. Hawley and Edward C. O'Neal, Everett, Wash., assignors to Western Gear Corporation, Everett, Wash., a corporation of Washington
Filed July 15, 1963, Ser. No. 294,951
12 Claims. (Cl. 74—410)

This invention relates to the use of herringbone gears, capable of seeking their own position axially with one another in the achievement of proper load distribution, in a power transmitting system which places the rotary axes of the herringbone gears in inclined planes of variable pitch. A dredging operation in which a working cutter head is carried upon the free end of a swing-mounted ladder, and drive passed thereto through reduction gears mounted at the head end of the ladder for rotation about axes normal to the swing axis of the ladder, exemplifies an operation to which the teachings of the present invention peculiarly lend themselves.

In a system of the described nature, the particular degree to which the rotary axes of the herringbone gears are inclined from the horizontal determines weight-induced thrust loading of the shafts which carry the gears. Thrust attributed to weight perforce changes with changes in the inclination of the shaft. For its general object the invention aims to provide a system which permits herringbone gears to be effectively employed, so that they will properly seek their own position axially with respect to one another, in installations where the axes about which the gears rotate are caused to occupy an inclined plane subject to variation in its pitch, and particularly to provide a system engineered in a manner which functions to balance endwise weight loading of the shafts for said gears by applying a counter-directed force of compensating intensity, the compensating thrust being controlled automatically by the degree of inclination of the plane which the shafts occupy.

A further object of the invention is to provide a system in which said counter-directed force is hydraulic.

As a further object still the invention purposes to provide a system compensating itself to weight differentials between one and another of the several herringbone gears in the reduction gear train.

It is a further and particular object to provide a system embodying a sensing device in conjunction with the control system, and in which indicator lights of the sensing device can be read at a point remote from the control system proper.

The foregoing and other objects and advantages will appear and be understood in the course of the following description and claims, the invention consisting in the novel construction and in the adaptation and combination of parts hereinafter described and claimed.

In said drawings:

FIGURE 1 is a fragmentary layout view partly in vertical section and partly diagrammatic illustrating a hydraulic thrust balancing system constructed to embody preferred teachings of the present invention, and also incorporating a wiring diagram of the counter-balance indicator which the system provides.

FIG. 2 is a fragmentary vertical sectional view detailing the manner of applying the hydraulic balancing pressure to a journaled shaft which is subject to changing endwise thrust in consequence of having its rotary axis positioned at varying degrees of tilt; and FIG. 3 is a fragmentary view illustrating, schematically, an operation of the type to which the present invention lends itself.

First having reference to FIG. 3, the numeral 10 denotes a barge or other like mounting for a dredge ladder 11. The dredge ladder has its upper end pivoted to the barge, as at 12, for vertical swing motion about a transverse horizontal axis. In a typical installation a cutter head (not shown) is located at the free end of the ladder. A drive shaft 13 for the cutter head is journaled from the ladder to rotate about an axis paralleling the longitudinal median line of the ladder, and driving said shaft are drive motors 14. The drive passes through reduction gear assemblies housed in a gear case 15 which surmounts the ladder adjacent its root end. The multiple gears, as 16 and 17, of said reduction gear assemblies are of the herringbone type and each rotates about an axis paralleling the rotary axis of the cutter head drive shaft 13, being fixed to respective shafts, as 18 and 19.

For ease of description, to reflect the condition which obtains when the ladder angles downwardly during a dredging operation, the ends of these gear shafts which lie uppermost will be hereinafter termed the high ends. The other ends will be termed the low ends. Both ends receive rotary journals from respective bearings 20. The outer races 21 of these bearings are given a slide mounting in boxes 22 welded or otherwise fixed to the end walls of the housing, thus permitting the shafts and their gears to float in a direction endwise to their axis. The boxes for the low ends of the shafts each are provided in the end wall 23 with an inwardly opening hydraulic cylinder. Two of these cylinders are shown in the drawings by way of example and are denoted by 24 and 25. Pistons, as 26 and 27, are received in the cylinders for endwise motion on an axis coinciding with the rotary axis of the shaft. The inner end of each piston protrudes from the related cylinder and is necked down, as at 28, to take a thrust and journal fit relative to the inner race of a ball bearing 30 socketed in the facing end of the shaft. The piston carries an O-ring seal 31.

By reason of the downward angling of the gear shafts as the dredge operates, thrust is concentrated by the force of gravity upon the low ends of the shafts. The thrust perforce varies as between the shafts, depending upon the weight which each shaft carries. The areas of the head walls of the two balance pistons 26 and 27 are each directly proportional to the ratio which the load of one bears to the load of the other. The hydraulic system for said cylinders 24 and 25 is wholly mounted upon the gear case and includes a continuously driven pump 32, a source of supply 33 therefor, and a pressure control device hereinafter to be described. Also provided is a sensing device responsive to the pressure obtaining in the high-pressure side of the hydraulic system and acting through switches to warn an operator in a control room remote from the ladder of an abnormally high or low pressure condition in the hydraulic system. A box 34 houses said pump, the reservoir, the control device, and the pressure-responsive components of the sensing device.

Proceeding to describe said control device, there is provided a body 35 formed with a horizontal bore and having an end passage 37 and a side passage 38 drilled to communicate with said bore. The axial line of the bore desirably parallels the axes of the gear shafts and the mouth of the bore lies at the end of the body 35 which corresponds to the high end of said shafts. A center-bored follower 40 threads into said mouth of the bore and at its inner end has a reduced nose prolongation. Such prolongation is counter-bored to fit over the outer end of a cylindrical valve chest 41, and presses the inner end of said chest against the closed end of the body bore. 42 denotes a sealing O-ring for such inner end. The diameter of the valve chest is reduced from that of the body bore and thus provides an annular chamber 43 surrounding the valve chest. Radial ports 44 drilled through the wall of the valve chest lead to said chamber and provide constant communication from the end passage 37 to the side passage 38.

A valve spool 45 is received for endwise motion within the valve chest and has a stop shoulder 46 which limits its inward travel to a point which "cracks" the ports 44. On the outer end of the valve spool is a stem 48 engaged by a plunger 50, and bearing against the plunger is the end of a thrust pin 51 carried upon a counter-weighted arm 52 swing-mounted by a pivot pin 53. The axis of the pivot pin occupies a horizontal plane normal to the axes of the gear shafts 18 and 19, and the thrust pin is radially offset from the pivot pin and lies normal to a plane which includes the axis of said pivot pin and the swing arm 52. A thread mounting of the thrust pin in the swing arm permits zero adjustment. A thread mounting of the counter weight 54 permits adjustment of the force.

From the pump 32, a supply line 55 leads to the end passage 37 of the valve body. Hydraulic fluid is drawn by a feed line 56 from the reservoir 33 to the pump, and a return line 57 extends from the passage 38 to the reservoir. A branch line 60 leads from the supply line 55 to cylinder 24 and thence by a connecting hydraulic line 61 to the other cylinder 25. Also leading from the supply line 55 is a branch line 62 for the pressure sensing device of the invention.

Employing a counter-weighted arm 63 swing-mounted by a pivot pin 64 having its axis paralleling that of the pivot pin 53, said branch line for the sensing device applies its pressure upon a plunger 65 against force imposed by the swing-arm 63. An upper extension 66 of the arm 63, when swung from a normal centered position in either of two directions, acts upon a respective one of two electric switches 67 and 68 to move the blades of the latter from the illustrated normal in-series positions whereat an electric circuit is completed through an indicating lamp 70 into positions whereat an electric circuit is completed, in one instance, through an indicator lamp 71 and, in the other instance, through an indicator lamp 72. The three lamps 70, 71 and 72 are located remote from the ladder in an operator's control room and indicate pressure conditions which are normal, below-normal and above-normal, respectively, for any given tilt of the dredge ladder.

For purposes of description the surface 73 of the box 34 is shown as being planar and located parallel to the axes of the gear shafts. Let it be assumed, in FIG. 1, that the ladder 11 has been tilted so that said surface is angled in the degree indicated from a true horizontal reference line $h$. The true vertical reference line, under this tilt condition, is shown at $v$. It will be apparent that the greater the angle between such vertical reference line and the axial line of the counter-weighted arm 52, assuming that the counter-weight and its position upon the arm remain constant, the greater is the force imposed through the plunger 50 upon the valve spool 45. With the entire volume of oil from the pump being discharged through the ports 44, the pressure condition within the high pressure side of the hydraulic system perforce rises and falls, with changes in tilt, in the degree necessary to maintain a balanced system.

Where A represents the cross sectional area of the balance pistons 26 and 27, B the cross sectional area of the valve spool 45, W the counterweight, $m$ the length of the moment arm measured from the pivot axis to the weight center of the counterweight, $n$ the length of the moment arm measured from said pivot axis to the axial center of the thrust pin 51, $p$ the hydraulic oil pressure, and $\phi$ the angle of the gear shafting, system equations are as follows:

(1) $\quad p \times A = \sin \phi \times \text{weight of gear assembly}$
(2) $\quad (p \times B) \times y = (W \sin \phi) \times m$ $$p = \sin \times \phi \left[ \frac{W \times m}{B \times n} \right]$$

For a particular installation the term $$\left[ \frac{W \times m}{B \times n} \right]$$

is constant. P is the function of the sin $\phi$.

As regards the sensing system, a pressure condition upon the plunger 65 which progressively rises with increasing tilt in accordance with a predetermined "norm" (for which the weight on the swing-arm 63 has been set) causes said plunger to remain stationary and consequently holds the swing-arm stationary, considered in relation to the box 34. There is thus no movement of the arm extension 66 relative to the two switches 67 and 68. However, should the pressure upon the plunger 65 at any given stage of said tilting movement be less than said norm, the weighted arm 63 will then lie closer to the vertical than would normally be the case. In consequence thereof the arm extension 66 presses upon the activating button of the switch 67 to move the latter inwardly from the normal position in which it is illustrated. The blade of switch 67 then opens the circuit including lamp 70 as it snaps into a position closing a circuit through the lamp 71, giving warning to the operator of an abnormally low pressure condition. Should the pressure upon the plunger 65 at any given stage of the ladder's said tilting movement be higher than said predetermined "norm," the weighted arm will then be responsively lifted from the vertical in a greater degree than normal pressure would accomplish. In such instance, the extension 66 is caused to be moved toward the right from center (closer to the switch 68 than the switch 67) with a responsive pressing upon the button of the switch 68. The blade of switch 68 thereupon snaps from the normal position in which it is illustrated into a position closing a circuit through the lamp 72, which perforce breaks the normally completed circuit through lamp 70. The operator is thus warned that an abnormally high pressure exists.

It is thought that the system of the present invention, and the manner of its functioning, will have been clearly understood from the foregoing detailed description of our now-preferred illustrated embodiment. Changes in the details of construction may be resorted to without departing from the spirit of the invention and it is accordingly our intention that no limitations be implied and that the hereto annexed claims be given the broadest interpretation to which the employed language fairly admits.

What we claim is:

1. In combination with a mechanism having a rotary shaft tiltable to changing angularities and by its weight subjected to progressively increasing endwise pressure as the tilt changes between flat and steep angles, means imposing upon the shaft a force acting counter to said endwise pressure, and a control system for said force-imposing means made to respond to changes in the tilt of the shaft and so operatively interconnected with the force-imposing means that the countering force imposed upon the shaft is kept in substantial balance with the endwise pressure.

2. Structure according to claim 1 in which the countering force imposed by said means is hydraulic.

3. Structure according to claim 2 in which the countering hydraulic force is imposed upon a piston journaled for slide motion along an axis coinciding with that of the shaft.

4. Structure according to claim 1 in which the countering force is hydraulically imposed upon a piston journaled for slide motion along an axis coinciding with that of the shaft, the control system including a hydraulic circuit, a circulating pump therefor, a valve governing the flow capacity of the high-pressure side of the circuit mounted for movement between a normal closed and an open position, a counter-weighted swing-arm so associated with the valve that its gravity-responsive movement yieldingly urges the valve toward a closed position, and a mounting for the valve and the swing-arm movable bodily in concert with the tilting movements of the shaft and having the swing-arm so mounted thereon that a line projected from the swing axis of the swing-arm through the weight center of the swing-arm tends to lie perpendicular to a reference plane of the mounting which remains parallel to the shaft axis, the cylinder for said piston being in communication with the high-pressure side of the hydraulic circuit.

5. Structure according to claim 4 having a pressure-sensing device indicating normal and abnormal pressure conditions in the high-pressure side of the hydraulic circuit.

6. Structure according to claim 4 having a pressure-sensing device read from a position remote from said mounting and indicating normal and abnormal pressure conditions in the high-pressure side of the hydraulic circuit.

7. In combination with a mechanism having meshing herringbone gears each fixed to a respective one of two shafts journaled for both rotary and endwise motion, with the rotary axis of the journal mountings tiltable to changing angularities and responsively subjecting the shafts to progressively increasing endwise weight loadings as the tilt changes between flat and steep angles, means imposing upon each of the two shafts a respective force acting counter to the concerned endwise pressure, and a control system for said force-imposing means made responsive to said change of angularity and so operatively interconnected with the force-imposing means that the countering force imposed upon the shafts is kept in substantial balance with the endwise pressure.

8. Structure according to claim 7 in which the countering force is hydraulic and for each shaft is imposed upon a related piston journaled for slide motion along an axis coinciding with that of the shaft, the control system including a hydraulic circuit, a circulating pump therefor, a valve governing the flow capacity of the high-pressure side of the circuit mounted for movement between a normal closed and an open position, a counter-weighted swing-arm so associated with the valve that its gravity-responsive movement yieldingly urges the valve toward a closed position, and a mounting for the valve and the swing-arm movable bodily in concert with the tilting movements of the shaft and having the swing-arm so mounted thereon that a line projected from the swing axis of the swing-arm through the weight center of the swing-arm tends to lie perpendicular to a reference plane of the mounting which remains parallel to the shaft axes, the cylinders for said pistons being in communication with the high-pressure side of the hydraulic circuit.

9. A mechansm according to claim 7, a source of hydraulic pressure comprising a hydraulic circuit having a circulating pump and a relief valve governing the flow capacity of the high-pressure side of the circuit, a counter-weighted swing-arm being provided so associated with the valve that its gravity-responsive movement yieldingly urges the valve in a flow-choking direction, and a mounting for the valve and the swing-arm movable bodily in concert with the ladder and having the swing-arm so mounted thereon that a line projected from the swing axis of the swing-arm through the weight center of the swing-arm tends to lie perpendicular to a reference plane of the mounting which remains parallel to the axes of the two gear shafts.

10. A mechanism according to claim 9, means being provided for adjusting the lengths of the moment arms of the swing arm.

11. Structure according to claim 9 having a pressure-sensing device read from a position remote from said mounting and indicating normal and abnormal pressure conditions in the high-pressure side of the hydraulic circuit.

12. In a dredge having a ladder hinged for swing motion in a vertical plane and carrying a longitudinally disposed cutter head drive shaft powered by an assembly of motor-driven herringbone reduction gears at least two of which gears are of differing mass and are fixed to a respective one of two shafts journal-mounted from the ladder for rotation about axes paralleling the longitudinal median line of the ladder, the combination with said two gear shafts, a respective hydraulic cylinder for each of said two gear shafts disposed co-axial thereto at the low end of the latter, a respective piston working in each of said cylinders with its upper end taking thrust from the low end of the related shaft, the cross-sectional areas of the pistons being in each instance directly proportional to the ratio between said differing masses, a source of hydraulic fluid under pressure, means for suplying hydraulic fluid from said pressure source to both of the cylinders, and means for controlling the source of pressure so that the thrust pressure imposed by the pistons upon the shafts is kept in substantial balance with the endwise pressure, said controlling means operating automatically in response to changes in the inclination of the ladder.

References Cited by the Examiner
UNITED STATES PATENTS

| | | | |
|---|---|---|---|
| 2,386,367 | 10/1945 | Taylor | 74—410 |
| 2,496,857 | 2/1950 | Cronstedt et al. | 74—410 |
| 2,659,240 | 11/1953 | Rubbra et al. | 74—410 |

DON A. WAITE, *Primary Examiner.*